US012257673B2

(12) United States Patent
Adams

(10) Patent No.: US 12,257,673 B2

(45) Date of Patent: *Mar. 25, 2025

(54) TORQUE WRENCH

(71) Applicant: Milwaukee Electric Tool Corporation, Brookfield, WI (US)

(72) Inventor: Caleb C. Adams, Milwaukee, WI (US)

(73) Assignee: Milwaukee Electric Tool Corporation, Brookfield, WI (US)

(*) Notice: Subject to any disclaimer, the term of this patent is extended or adjusted under 35 U.S.C. 154(b) by 0 days.

This patent is subject to a terminal disclaimer.

(21) Appl. No.: 18/496,444

(22) Filed: Oct. 27, 2023

(65) Prior Publication Data

US 2024/0051098 A1 Feb. 15, 2024

Related U.S. Application Data

(63) Continuation of application No. 17/846,873, filed on Jun. 22, 2022, now Pat. No. 11,833,645, which is a (Continued)

(51) Int. Cl.

*B25B 23/142* (2006.01)

*B25B 23/14* (2006.01)

(52) U.S. Cl.

CPC ........ *B25B 23/1427* (2013.01); *B25B 23/141* (2013.01)

(58) Field of Classification Search

None

See application file for complete search history.

(56) References Cited

U.S. PATENT DOCUMENTS

| | | | |
|---|---|---|---|
| 1,578,065 | A | 3/1926 | Bemus et al. |
| 1,628,467 | A | 5/1927 | Mandl |

(Continued)

FOREIGN PATENT DOCUMENTS

| | | |
|---|---|---|
| CN | 102039568 | 5/2011 |
| CN | 102216035 | 10/2011 |

(Continued)

OTHER PUBLICATIONS

International Search Report and Written Opinion for International Application No. PCT/US2021/024931, dated Jul. 22, 2021, 10 pages.

(Continued)

*Primary Examiner* — Bryan R Muller
*Assistant Examiner* — Dana Lee Poon
(74) *Attorney, Agent, or Firm* — Reinhart Boerner Van Deuren s.c.

(57) ABSTRACT

A dual-beam torque wrench with a linear display and a linear locking member is provided. The torque wrench includes a head that couples to a socket to rotate a fastener or bolt. A housing of torque wrench extends from the head to form a handle. Within the housing forming the handle are two beams: a lever beam that transmits the force from the handle to the head and a deflecting beam that couples to the head and not the handle. The deflecting beam deflects away from the lever beam to indicate that a predetermined torque has been applied. A torque adjustment assembly moves the lever beam relative to the head to set the predetermined torque, and a pin follows the linear display to indicate to the user the set predetermined torque.

20 Claims, 8 Drawing Sheets

Related U.S. Application Data continuation of application No. 17/221,234, filed on Apr. 2, 2021, now Pat. No. 11,396,091, which is a continuation of application No. PCT/US2021/024931, filed on Mar. 30, 2021.

(60) Provisional application No. 63/004,877, filed on Apr. 3, 2020.

(56) References Cited

U.S. PATENT DOCUMENTS

| | | | | | |
|---|---|---|---|---|---|
| 1,807,134 | A | | 5/1931 | Pfauser | |
| 1,873,472 | A | | 8/1932 | Pfauser | |
| 2,290,197 | A | | 7/1942 | Merriman et al. | |
| 2,362,149 | A | | 11/1944 | Nelson | |
| 2,667,800 | A | | 2/1954 | Garwood | |
| 2,686,446 | A | | 8/1954 | Livermont | |
| 2,789,454 | A | * | 4/1957 | Woods | B25B 23/1427 81/481 |
| 2,887,921 | A | | 5/1959 | Livermont | |
| 3,577,815 | A | | 5/1971 | Bergquist | |
| 3,638,519 | A | | 2/1972 | Rebold | |
| 3,772,942 | A | | 11/1973 | Grabovac | |
| 3,786,699 | A | | 1/1974 | Kobayashi | |
| 3,839,928 | A | | 10/1974 | Bergquist | |
| 3,847,038 | A | * | 11/1974 | Green | B25B 23/1427 81/477 |
| 4,019,412 | A | | 4/1977 | Kraus et al. | |
| 4,084,455 | A | * | 4/1978 | Budrose | B25B 13/14 74/577 M |
| 4,249,435 | A | | 2/1981 | Villeneuve | |
| 4,290,329 | A | * | 9/1981 | Green | B25B 23/1427 81/477 |
| 4,408,504 | A | | 10/1983 | Dobosh | |
| 4,603,606 | A | | 8/1986 | Headen | |
| 4,665,390 | A | | 5/1987 | Kern et al. | |
| 4,709,598 | A | | 12/1987 | Headen | |
| 4,709,602 | A | | 12/1987 | Grabovac et al. | |
| 4,732,062 | A | | 3/1988 | Grabovac | |
| 4,805,464 | A | * | 2/1989 | Grabovac | B25B 23/1427 73/862.26 |
| 4,939,961 | A | | 7/1990 | Lee | |
| 5,007,311 | A | | 4/1991 | Lee | |
| 5,199,329 | A | | 4/1993 | Hsu | |
| 5,337,638 | A | | 8/1994 | Coss et al. | |
| 5,537,877 | A | | 6/1996 | Hsu | |
| 5,619,890 | A | | 4/1997 | Hattori et al. | |
| 5,653,151 | A | | 8/1997 | Blacklock | |
| 5,709,137 | A | | 1/1998 | Blacklock | |
| 5,996,453 | A | | 12/1999 | Blacklock | |
| 6,167,787 | B1 | | 1/2001 | Jarvis | |
| 6,334,377 | B1 | | 1/2002 | Wu | |
| 6,655,242 | B2 | | 12/2003 | Gambarini | |
| 6,742,418 | B2 | | 6/2004 | Amami | |
| 6,990,877 | B1 | | 1/2006 | Wu | |
| 7,168,349 | B1 | | 1/2007 | Hsieh | |
| 7,168,350 | B1 | | 1/2007 | Hsieh | |
| 7,174,817 | B1 | | 2/2007 | Hsieh | |
| 7,182,005 | B1 | | 2/2007 | Hsieh | |
| 7,185,571 | B1 | | 3/2007 | Hsieh | |
| 7,267,033 | B1 | | 9/2007 | Lai | |
| 7,331,246 | B2 | | 2/2008 | Escoe et al. | |
| 7,367,250 | B2 | | 5/2008 | Rainone et al. | |
| 7,493,830 | B2 | | 2/2009 | Escoe et al. | |
| 7,806,027 | B1 | | 10/2010 | Gao | |
| 7,942,085 | B2 | | 5/2011 | Hsieh | |
| 8,443,702 | B2 | | 5/2013 | Kan et al. | |
| 8,607,675 | B2 | | 12/2013 | Tsai | |
| 9,021,921 | B2 | | 5/2015 | Ogata et al. | |
| 9,089,957 | B2 | | 7/2015 | Chen | |
| 9,452,517 | B2 | | 9/2016 | Hsieh | |
| 9,457,457 | B2 | | 10/2016 | Chiang | |
| 9,505,110 | B2 | | 11/2016 | Hsieh | |
| 9,527,194 | B2 | | 12/2016 | Kerboul et al. | |
| 9,597,782 | B2 | | 3/2017 | Abel | |
| 2004/0083858 | A1 | | 5/2004 | Carnesi | |
| 2006/0102442 | A1 | | 5/2006 | Dein | |
| 2007/0095155 | A1 | | 5/2007 | Rainone et al. | |
| 2007/0256525 | A1 | | 11/2007 | Lee | |
| 2008/0229888 | A1 | | 9/2008 | Ishmael | |
| 2008/0276762 | A1 | | 11/2008 | Dein | |
| 2009/0260491 | A1 | * | 10/2009 | Rainone | B25B 23/1425 81/479 |
| 2011/0023576 | A1 | * | 2/2011 | Mountz | G01L 5/24 73/862.21 |
| 2012/0132042 | A1 | | 5/2012 | Bruce | |
| 2012/0132043 | A1 | | 5/2012 | Chen | |
| 2013/0185945 | A1 | | 7/2013 | Wang | |
| 2015/0190918 | A1 | | 7/2015 | Wang | |
| 2015/0314426 | A1 | | 11/2015 | Chiang | |
| 2015/0343621 | A1 | | 12/2015 | Hsieh | |
| 2015/0343627 | A1 | | 12/2015 | Hensley | |
| 2016/0243686 | A1 | | 8/2016 | Hsieh | |
| 2016/0271761 | A1 | | 9/2016 | Chang | |
| 2017/0028539 | A1 | | 2/2017 | Hsieh | |
| 2018/0099386 | A1 | * | 4/2018 | Reeder | B25B 13/465 |
| 2018/0099387 | A1 | * | 4/2018 | Reeder | B25B 23/1427 |
| 2020/0298384 | A1 | * | 9/2020 | Reeder | B25B 13/465 |

FOREIGN PATENT DOCUMENTS

| | | |
|---|---|---|
| CN | 203818054 | 9/2014 |
| DE | 202006019413 | 3/2007 |
| DE | 102013208289 | 11/2014 |
| DE | 202016002404 | 6/2016 |
| EP | 2110206 | 10/2009 |
| FR | 1307374 | 10/1962 |
| FR | 1431041 | 3/1966 |
| TW | 175051 | 12/1991 |
| TW | M256804 | 2/2005 |
| TW | M377293 | 4/2010 |
| TW | 201026447 | 7/2010 |
| TW | M429559 | 5/2012 |
| WO | WO8604008 | 7/1986 |
| WO | WO9904178 | 1/1999 |
| WO | WO9936229 | 7/1999 |
| WO | WO05032397 | 4/2005 |
| WO | WO2010076331 | 7/2010 |
| WO | WO2013/117888 | 8/2013 |

OTHER PUBLICATIONS

Precision Instruments PREC3FR250F Silver ½" Drive Split Beam Torque Wrench with Flex Head, available at <https://www.amazon.ca/Precision-Instruments-PREC3FR250F-Silver-Torque/dp/B002XMSFIM>, believed to be available at least as early as Sep. 20, 2013, 9 pages.

* cited by examiner

TORQUE WRENCH

CROSS-REFERENCE TO RELATED PATENT APPLICATIONS

The present application is a continuation of U.S. application Ser. No. 17/846,873, filed on Jun. 22, 2022, which is a continuation of U.S. application Ser. No. 17/221,234, now U.S. Pat. No. 11,396,091, filed Apr. 2, 2021, which is a continuation of International Application No. PCT/US2021/024931, filed Mar. 30, 2021, which claims the benefit of and priority to U.S. Provisional Application No. 63/004,877, filed on Apr. 3, 2020, which are incorporated herein by reference in their entireties.

BACKGROUND OF THE INVENTION

The present invention generally relates to the field of torque wrenches used to tighten fasteners to a predetermined applied torque setting or value.

SUMMARY OF THE INVENTION

One embodiment of the invention relates to a torque wrench with a head configured to engage a fastener and a handle configured to be grasped by a user. The torque wrench futher including a lever beam, a deflecting beam, and a torque adjustment mechanism. The lever beam is coupled at one end to the handle and coupled at an opposite end to the head. The deflecting beam is coupled to the head and selectively coupled to the lever beam. The torque adjustment mechanism includes a frame, a pinion, and a locking lever. The frame is located within the handle and has a rack gear. The pinion gear is coupled to the rack gear. The locking lever is biased away from the rack gear. A locking member selectively engages the locking lever with the frame to lock the torque adjustment mechanism relative to the handle.

Another embodiment of the invention relates to a torque wrench with a head configured to engage a fastener and a handle extending along a longitudinal axis and comprising a window through the handle. The torque wrench further including a lever beam, a deflecting beam, and a torque adjustment mechanism. The lever beam is coupled on a first end to the head and a second end to the handle. The deflecting is beam coupled to the head. The torque adjustment mechanism includes a frame and a pin. The frame is located within the handle and has a slot extending along the longitudinal axis of the handle. The pin extends through the slot to indicate an applied torque on the lever beam.

Another embodiment of the invention relates to a torque wrench including a head, a handle, a lever beam, a deflecting beam, and a torque adjustment mechanism. The head is configured to engage a socket and/or a fastener and coupled to the handle. The handle extends along a longitudinal axis and has a window through the handle. The lever beam is coupled at one end to the handle and an opposite end to the head. The deflecting beam is coupled to the head and selectively coupled to the lever beam, such that decoupling of the deflecting beam and the lever beam indicates that a torque limit has been applied. The torque adjustment mechanism has a partially exposed frame within the handle. The frame includes a rack gear and a readout slot at least partially visible through the window and extending along the longitudinal axis of the handle. The torque adjustment mechanism further includes a pinion gear coupled to the rack gear, a locking lever, a locking member, and a pin. The locking lever is biased away from the rack gear and selectively engages the rack gear of the frame to lock the torque adjustment mechanism relative to the handle. The locking member is coupled to the frame opposite the rack gear and engages a portion of the locking lever to force the locking lever against the rack gear of the frame. The pin extends through the slot to indicate an applied torque on the lever beam.

In various additional embodiments, the handle couples to the head and surrounds the lever beam and the deflecting beam. In some embodiments, the frame is formed within the handle, such that the frame and the handle are a single unitary piece and the handle includes the rack gear and a slot. In some embodiments, the locking member is located on the handle.

In variuos embodiments, a cover and/or a linear display enhance the visibility and/or resolution of the applied torque setting. The linear display extends along a frame in a direction substantially parallel to the longitudinal axis to increase the linear display area. In various embodiments, the cover moves as the applied torque increases or decreases and/or includes a window to focus the user's vision on the applied torque setting.

Alternative exemplary embodiments relate to other features and combinations of features as may be generally recited in the claims.

BRIEF DESCRIPTION OF THE DRAWINGS

This application will become more fully understood from the following detailed description, taken in conjunction with the accompanying figures, wherein like reference numerals refer to like elements in which.

DETAILED DESCRIPTION

Referring generally to the figures, various embodiments of a split beam torque wrench are shown. Split beam torque wrenches are robust instruments used, for example, in high torque situations in which a relatively accurate torque application is applied. In some embodiments discussed herein, the torque wrench uses a spin wheel to adjust a torque setting on a lever beam and include a display that shows the applied torque setting. In some embodiments, the torque setting is applied with a spring-loaded locking member. Applicant has found that using a locking member over a frame that adjusts the lever beam, the torque wrench designs discussed herein enhance resolution, provide a more straightforward assembly, reduce components in the torque wrench, and/or permit single-handed operation (e.g., one hand operation).

Figure 1:
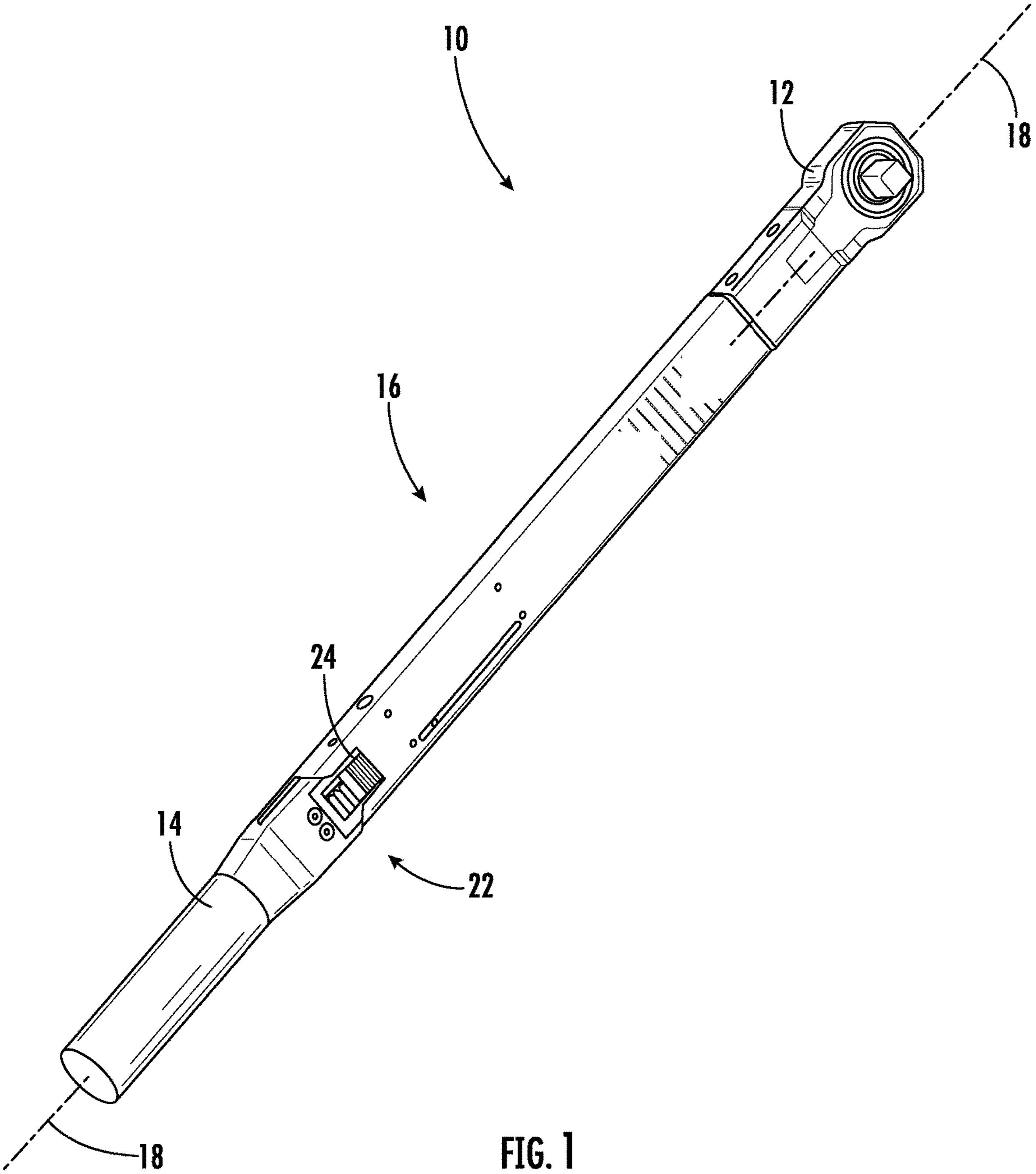
FIG. 1 is a perspective view of a torque wrench, according to an exemplary embodiment.

FIG. 1 shows a torque wrench 10 that applies a predetermined or preset amount of torque (e.g., an applied torque) to a fastener within a socket. Torque wrench 10 includes a head 12, a handle 14 formed on or as part of a housing 16 defining a longitudinal axis 18, a torque adjustment mechanism 20 (FIG. 2), and a sliding button or locking member 22. In a specific embodiment, handle 14 extends along longitudinal axis 18 and is configured to be grasped by a user. Head 12 is configured to engage a fastener. In use, a user rotates an adjustment dial 24 on torque adjustment mechanism 20 to select an applied torque, or the maximum torque, that head 12 will apply to a fastener or socket when handle 14 is rotated.

Figure 2:
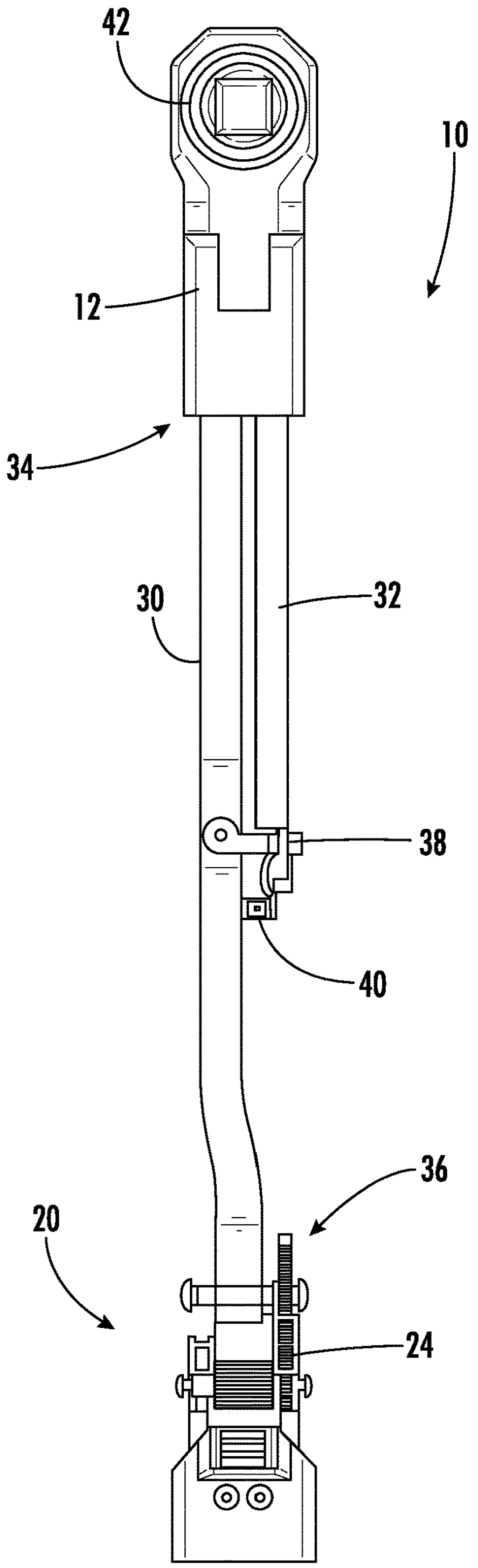
FIG. 2 is a side view of the torque wrench of FIG. 1 with a handle removed, according to an exemplary embodiment.

FIG. 2 shows torque wrench 10 with handle 14 and/or a cover 26 (FIG. 3) removed. Torque wrench 10 includes a primary or lever beam 30 and a secondary or deflection beam 32. In some embodiments, lever beam 30 and/or deflection beam 32 are located within housing 16 of handle 14. Lever beam 30 has a first end 34 coupled to head 12 and a second end 36, opposite first end 34, coupled to or forming handle 14. Lever beam 30 couples a force applied by a user at handle 14 to rotate with head 12 and/or a fastener or socket coupled to head 12. Lever beam 30 and deflection beam 32 extend along longitudinal axis 18 adjacent to one another.

Deflection beam 32 is coupled to head 12 and selectively coupled to level beam 30. In contrast to lever beam 30, deflection beam 32 does not fully extend from head 12 to handle 14 but is located under housing 16 and/or cover 26, between handle 14 and head 12. A trigger or switch 38 releasably couples deflection beam 32 to lever beam 30. In some embodiments, a biasing element, shown as spring 40, biases switch 38 against at least one of lever beam 30 and deflection beam 32. Switch 38 overcomes the biasing force of spring 40 to decouple deflection beam 32 from lever beam 30 as a result of the torque applied to handle 14 exceeding a set applied torque (e.g., a maximum torque selected by torque adjustment mechanism 20). In various embodiments, the decoupling of lever beam 30 from deflection beam 32 creates a sound, a tactile sensation, and/or releases a ratchet mechanism 42 in head 12 such that further rotation of handle 14 does not apply torque to the socket or fastener coupled to head 12. Thus, torque adjustment mechanism 20 is configured for a user to adjust and/or set a predetermined applied torque on a fastener in the socket coupled to head 12 and limit excessive torquing of the fastener or socket.

Figure 3:
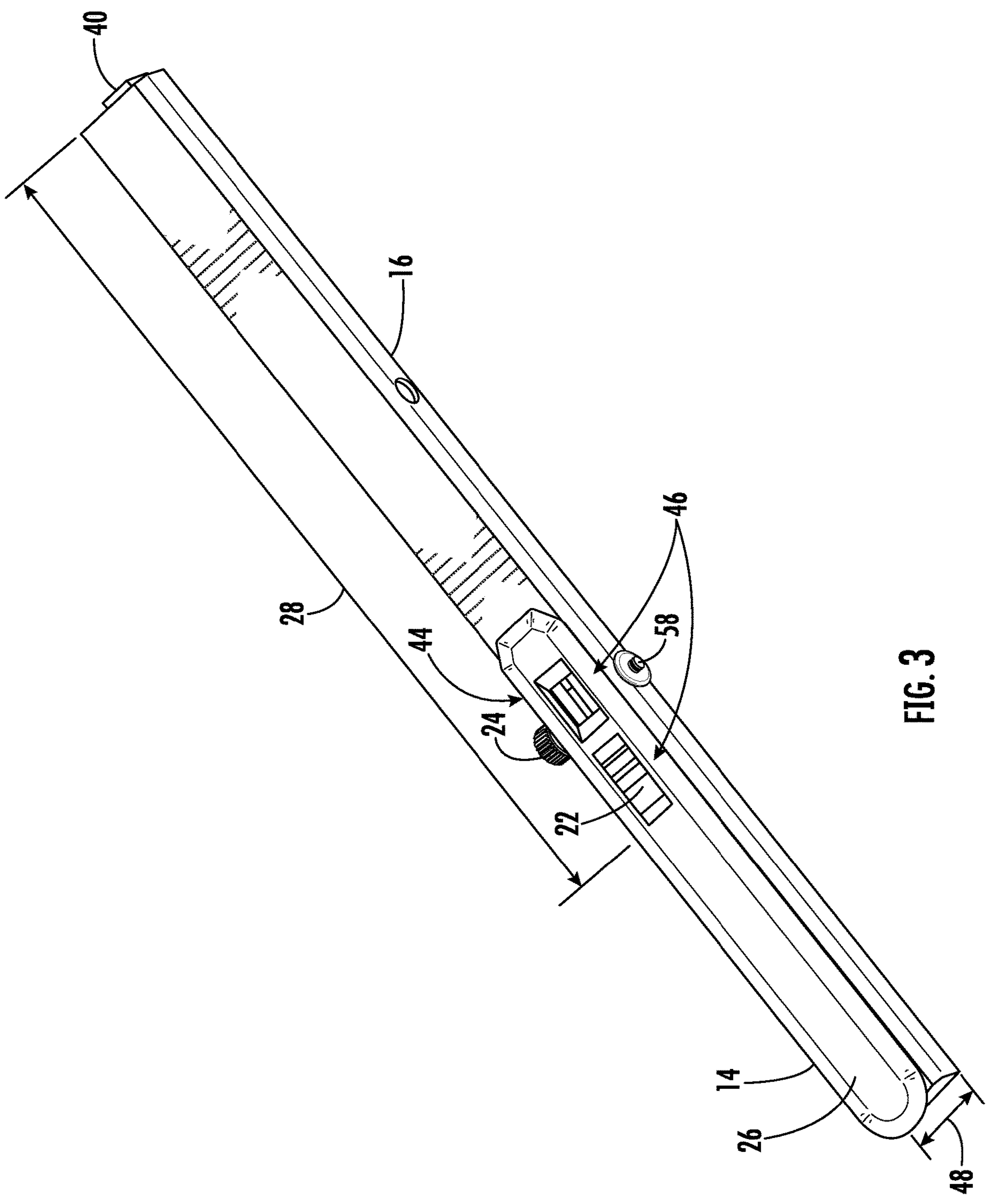
FIG. 3 is an isolated handle of a torque wrench, according to an exemplary embodiment.

FIG. 3 shows handle 14 formed with cover 26 on torque wrench 10, according to an exemplary embodiment. Cover extends along housing 16 between head 12 and handle 14 and defines a length 28 of torque wrench 10 housing 16. Length 28 begins at a bottom of switch and extends to the coupling with head 12. As shown in FIG. 3, housing 16 includes handle 14 in housing 16, forming a continuous integral part, such that the grasping portion of housing 16 held by a user is handle 14. Another portion of housing 16 surrounds lever beam 30 and/or deflection beam 32, e.g., to prevent moisture or debris from interfering with switch 38. For example, handle 14 couples directly to head 12 and at least partially surrounds lever beam 30 and/or deflection beam 32.

Figure 5:
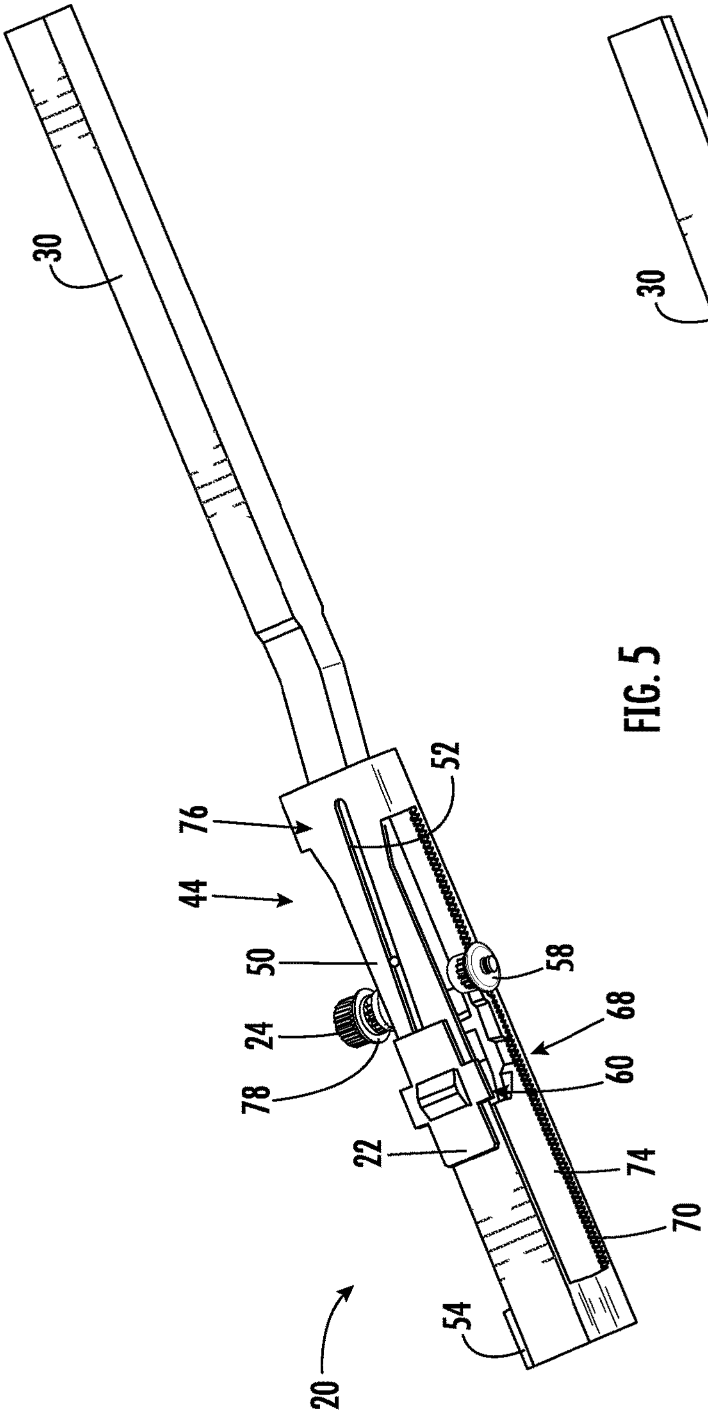
FIG. 5 is a frame capturing a locking member and a torque adjustment mechanism coupled to a lever beam, according to an exemplary embodiment.
Figure 6:
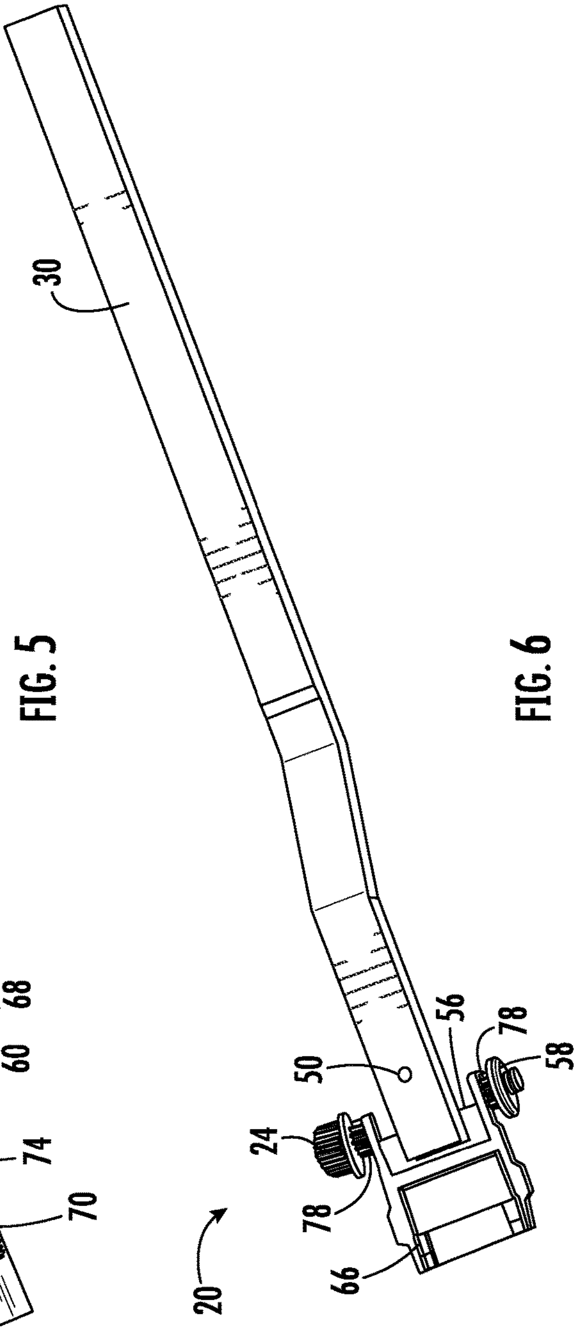
FIG. 6 is a torque adjustment mechanism coupled to the lever beam, according to an exemplary embodiment.

A linear display 44 is visible through a window 46 in cover 26, housing 16, and/or handle 14. In a specific embodiment, handle 14 an opening, shown as window 46, through handle 14. Linear display 44 shows the applied torque setting of torque adjustment mechanism 20. For example, linear display 44 includes indicia indicative of metric (e.g., N-m) and/or English (e.g., ft-lb) units of applied torque. In some embodiments, linear display 44 extends along longitudinal axis 18 to increase length 28 of linear display 44. Conventional torque wrenches have radial displays to show the applied torque setting and are limited to a width 48 dimension (FIG. 2, e.g., extending transverse to longitudinal axis 18) of housing 16. The resolution of the applied torque shown on a conventional display is limited by the width 48 dimension. Applicant has found that linear display 44 enhances the visual readout of the applied torque setting because linear display 44 provides a greater surface area to display the adjusted and set by applied torque. In addition, length 28 and/or the resolution of linear display 44 is independent of handle 14 width 48 dimensions. For example, a pin 50 is coupled to lever beam 30 and moves with lever beam 30 through a readout slot 52 on a frame 54 as adjustment dial 24 is rotated to move components of torque adjustment mechanism 20. This configuration creates a high-resolution and scalable linear display 44 (FIGS. 5-6).

Adjustment dial 24 has an axel 56 (FIG. 6) that extends through lever beam 30 and is secured at an opposite end of housing 16. For example, axel 56 extends from adjustment dial 24 to a follower 58 (or another adjustment dial 24) on an opposite end of axel 56. In some embodiments, adjustment dial 24 and/or follower 58 are partially enclosed by housing to increase pocketability (the ease with which the torque wrench is stored in a pocket or pouch). In some embodiments, two adjustment dials 24 are located on either end of axel 56. Alternatively, adjustment dial 24 is configured for either left-handed and/or right-handed use.

Figure 4:
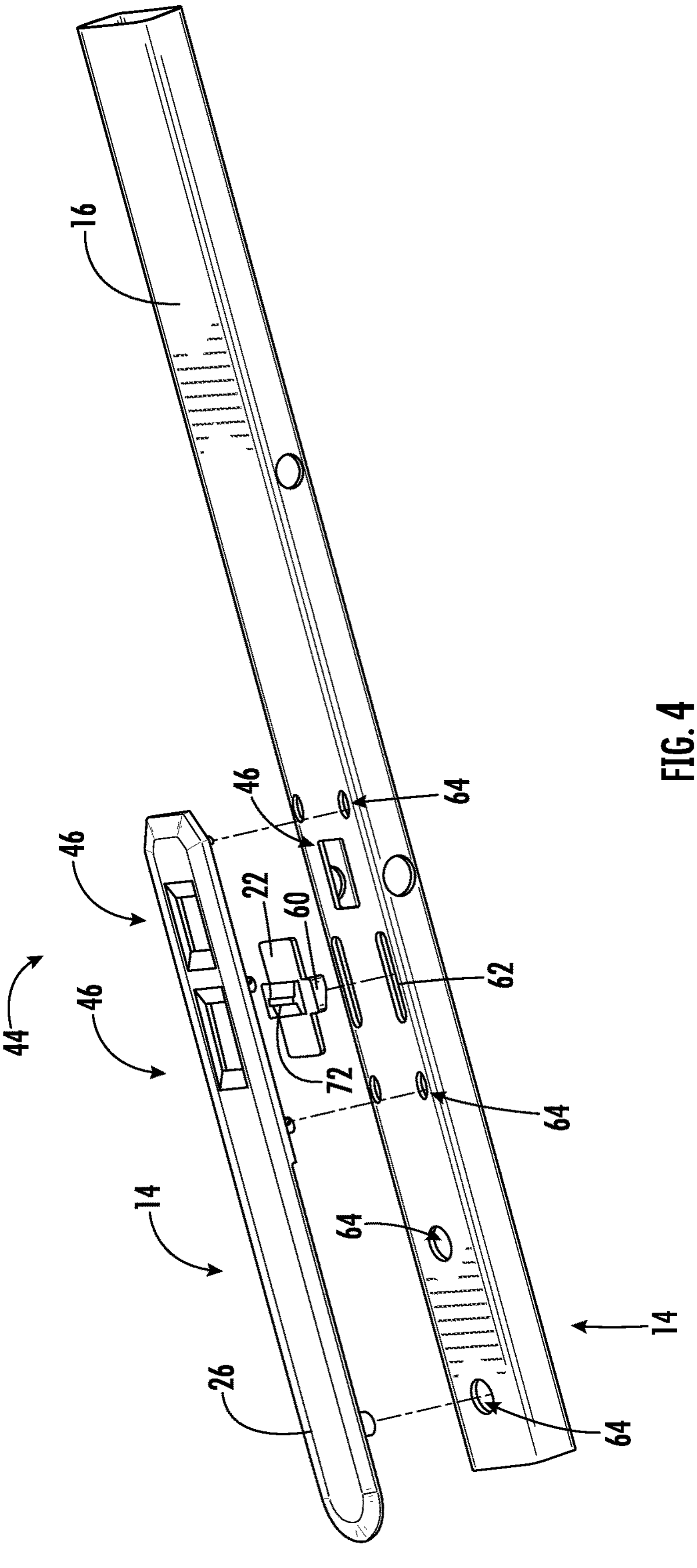
FIG. 4 is an exploded view of the cover, capturing a locking member on the handle of FIG. 3, according to an exemplary embodiment.

FIG. 4 is an exploded view of cover 26, locking member 22, and handle 14 (e.g., including housing 16). The exploded view shows window 46 capturing locking member 22 against handle 14. In a specific emboduiment, locking member 22 is coupled to handle 14. For example, cover 26 includes window 46 and is slidably coupled to handle 14, such that cover 26 and/or window 46 move relative to (e.g., in proportion) to pin 50 to indicate the applied torque of torque adjustment mechanism 20. This configuration enables a sliding scale or adjustable linear display 44 of torque values as the applied torque is changed.

FIG. 4 shows projections or protrusions 60 on locking member 22 that fit within rails 62 of housing 16 to guide and/or limit the movement of locking member 22. Similarly, various openings 64 in housing 16 are designed to guide and/or limit movement of cover 26 relative to housing 16. Locking member 22 is slidably captured by a second window 46 of cover 26 between cover 26 and frame 54 of torque adjustment mechanism 20. Locking member 22 is coupled to handle 14 and/or captured between cover 26 and frame 54. In a specific embodiment, locking member 22 is coupled to frame 54 opposite rack gear 70. In some embodiments, protrusions 60 of locking member 22 is configured to engage a portion of locking lever 66 to force locking lever 66 against rack gear 70 of frame 54. For example, protrusions 60 extend through slots (e.g., that form rails 62) of handle 14 or housing 16 to engage a formation or detent 68 on locking lever 66 that engages with a rack gear 70 to set the applied torque value (FIGS. 4-5 and 9-12). In this way, a user presses on a gripping area 72 of locking member 22 to slide protrusions 60 into detents 68 of locking lever 66 and force teeth 74 on a bottom of locking lever 66 to engage with teeth 74 on rack gear 70 and lock torque adjustment mechanism 20 at a predetermined applied torque. In this way, locking lever 66 selectively engages rack gear 70 of frame 54 to lock torque adjustment mechanism relative to handle 14.

FIG. 5 shows a frame 54 that captures locking member 22 and/or torque adjustment mechanism 20. A surface area 76 includes applied torque indicia of linear display 44 marked adjacent to a readout slot 52 on frame 54. The resolution on surface area 76 for indicia in linear display 44 is enhanced due to the extended length 28 (as compared to width 48) of housing 16. Torque adjustment mechanism 20 includes a lever beam 30 that selectively and releasably engages locking member 22. In some embodiments, linear display 44 is applied directly to frame 54 and is visible through windows 46 (e.g., in cover 26, handle 14, and/or housing 16). For example, linear display 44 is located on frame 54 and is visible through window 46 of cover 26, housing 16, and/or handle 14. Linear display 44 includes indicia for the applied torque resolution in both metric units (e.g., N-m or J/rad) and English units (e.g., ft-lb or in-lb), or other torque units.

Torque adjustment mechanism 20 includes frame 54 with a rack gear 70 and a mating pinion gear 78 coupled to adjustment dial 24, locking member 22 and locking lever 66. Pinion gear 78 is rotateably engaged with rack gear 70. In a specific embodiment, pinion gear 78 actuates along longitudinal axis 18 with respect to rack gear 70. In a specific embodiment, frame 54 is within handle 14. In some embodiments, frame 54 is partially exposed within handle 14, e.g., to support linear display 44 (e.g., a sticker with indicia applied to frame 54). Frame 54 includes rack gear 70 and a readout slot 52 at least partially visible through window 46, e.g., such that a moving cover 26 retains visibility through window 46. Frame 54 extends along longitudinal axis 18 of handle 14.

A pinion gear, such as pinion gear 78, is coupled to adjustment dial 24, e.g., rigidly coupled, to move components of torque adjustment mechanism along the rack gear 70 and/or to move lever beam 30 relative to head 12. For example, rotation of adjustment dial 24 moves pinion gear 78 along rack gear 70 to move locking lever 66 within frame 54 and lever beam 30 relative to head 12. In a specific embodiment, adjustment dial 24 is engaged with frame 54, and adjustment dial 24 actuates along longitudinal axis 18. In some embodiments, locking lever 66 is biased away from rack gear 70 of frame 54, such that without an external force acting on locking lever, torque adjustment mechanism 20 remains in an unlocked position. When a force is applied to overcome the biasing force, locking lever 66 selectively engages frame 54, e.g., along rack gear 70 to lock the movement of torque adjustment mechanism 20 relative to handle 14 and/or head 12. In this way, locking lever 66 sets (e.g., locks) the applied torque value of head 12 that limits the applied torque on the fastener and/or socket.

In some embodiments, a locking member 22 is also coupled to frame 54, e.g., on a side opposite rack gear 70. For example, rack gear 70 is located on an inside bottom plane of frame 54, and locking member 66 is located on an outer top plane of frame 54. Locking member 22 selectively engages a portion (e.g., a protrusion or detent 68) on locking lever 66 to overcome the bias between locking lever 66 and rack gear 70 and force locking lever 66 to engage with (e.g., against) rack gear 70 of frame 54 and causing teeth 74 on locking lever to engage or mesh with teeth 74 on rack gear 70. As a result, torque adjustment mechanism 20 is locked relative to handle 14. In this configuration, locking member 22 acts to lock the applied torque of torque wrench 10.

Pin 50 extends through and/or is visible through readout slot 52 to indicate the applied torque setting exerted on lever beam 30. In some embodiments, readout slot 52 in frame 54 includes an elongate shape and extends along longitudinal axis 18 of handle 14. Pin 50 and readout slot 52 collectively form linear display 44. In other words, linear display 44 surrounds readout slot 52 and includes indicia of an applied torque on torque adjustment mechanism 20. The indicia have indications of applied torque resolution for a hundredth of a foot-pound (ft-lb) of applied torque.

A carrier track or rail 62 extends along a top planar surface of frame 54 to permit movement of locking member 22. As shown in FIG. 6, rail 62 extends along the top planar surface on both sides of frame 54 and extends along longitudinal axis 18 to carry or slide locking member 22 in a direction parallel to longitudinal axis 18. Similarly, rail 62 limits the movement of locking member 66 in a transverse direction to longitudinal axis 18, such that locking member 22 moves back and forth along longitudinal axis 18 relative to handle 14 and/or housing 16, but is not free to move in other directions.

FIG. 6 shows components of torque adjustment mechanism 20 that couple to lever beam 30. Specifically, FIG. 6 shows a locking lever 66, adjustment dial 24, pinion gears 78, axel 56, follower 58, lever beam 30, and pin 50. In various embodiments, pin 50 is coupled to at least one of lever beam 30, torque adjustment mechanism 20, and/or locking lever 66. Locking lever 66 couples to axel 56 running from adjustment dial 24 to follower 58 (or another adjustment dial 24) and is pivotable about axel 56. In other words, axel 56 functions as a pivot for locking lever 66. Teeth 74 on pinion gears 78 engage with teeth 74 on rack gear 70 of frame 54 to move locking lever 66, and lever beam 30 relative to handle 14 and head 12 and change the applied torque at head 12 by changing the biasing force between lever beam 30 and deflection beam 32 at switch 38. When lever beam 30 moves relative to deflection beam 32, a force to overcome the bias at switch 38 is proportional to the predetermined applied torque applied at head 12. Pin 50 indicates the relative movement of lever beam 30, and thus the set applied torque limit at head 12. In some embodiments, when the applied torque is reached, an audible, visual, and/or spring within ratchet mechanism 42 limits further torque application from handle 14 at head 12.

In some embodiments, cover 26, handle 14, housing 16, and/or frame 54 have windows 46, such that a bottom of locking member 22 extends within cover 26 and/or frame 54 located inside cover 26. As will be described in greater detail below, locking member 22 selectively engages or couples to locking lever 66 on torque adjustment mechanism 20 to lock the applied torque setting and limit the torque applied at head 12. In some embodiments, cover 26 and/or locking member 22 may be slidably coupled to frame 54 such that window 46 of cover 26 narrows or limits a user's view to a specific region containing pin 50 in readout slot 52. This embodiment enhances the focus of linear display 44 and also allows for higher resolution along linear display 44 since the resolution is limited by length 28 and not width 48 of housing 16.

Figure 7:
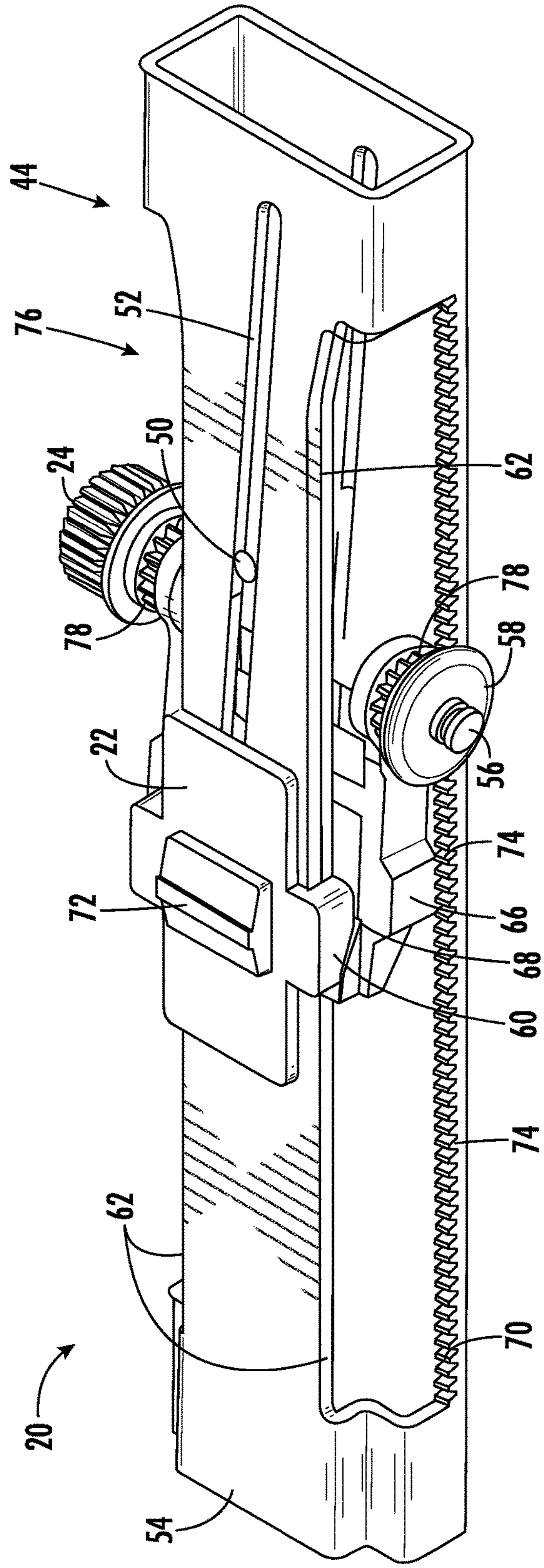
FIG. 7 is a perspective view of a locking member and torque adjustment mechanism on a frame, according to an exemplary embodiment.

FIG. 7 is a perspective view of locking member 22 and torque adjustment mechanism 20 on frame 54. Adjustment dial 24 rotates pinion gears 78 and teeth 74 engaged with teeth 74 of rack gear 70 to move torque adjustment mechanism 20. As described above, with reference to FIG. 6, as torque adjustment mechanism 20 moves, lever beam 30 moves, and the applied torque setting changes. This change is reflected in the surface area 76 of frame 54 that includes indicia on the sides of readout slot 52. The position of pin 50 on lever beam 30 within readout slot 52 indicates indicia of the applied torque setting. As shown in FIG. 7, pin 50 extends through readout slots 52 on either side of frame 54 such that a user can read the applied torque setting on both sides (e.g., top and bottom) of torque wrench 10. Once pin 50 indicates that torque adjustment mechanism 20 has reached the desired applied torque limit for head 12, the user slides locking member 22 over locking lever 66. In this way, locking member 22 presses on locking lever 66 to engage teeth 74 on locking lever 66 with corresponding teeth 74 on rack gear 70. The engagement of locking lever 66 with rack gear 70 locks or sets the desired applied torque limit for head 12. In some embodiments, locking member 22 is recessed within cover 26 to prevent accidental locking/unlocking of torque adjustment mechanism 20. In addition, the force withstood by lockin member 22 and/or locking lever 66 (e.g., required to lock/unlock the mechanism) is scalable by changing the length and/or form of protrusions 60 and/or the number and/or size of teeth 74 on locking lever 66 and rack gear 70.

In some embodiments, frame 54 is formed directly within handle 14 to form a single part. For example, frame 54 and handle 14 are a single unitary piece or part, and an interior of handle 14 includes rack gear 70 and readout slot 52. In some embodiments, housing 16, handle 14, and frame 54 are all one integral part.

Figure 8:
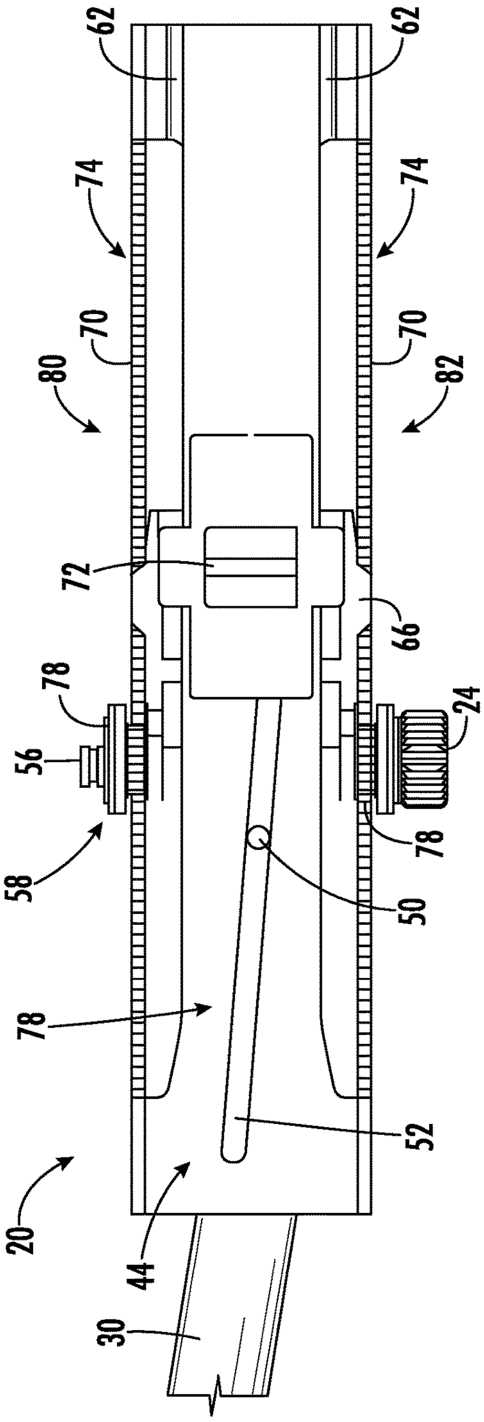
FIG. 8 is a top view of FIG. 7, including a pin to indicate the applied torque and coupled to either the lever beam or the torque adjustment mechanism, according to an exemplary embodiment.

FIG. 8 shows a top view of locking member 22 on rails 62 of frame 54 and pin 50 on lever beam 30 inserted through readout slot 52. In this configuration, a starting vertical position of pin 50 determines the applied torque value, such that movement of pin 50 in readout slot 52 will change both in the horizontal and vertical direction as adjustment dial 24 rotates to indicate changes in the applied torque. Pin 50 is coupled to a moving component such as lever beam 30 and/or a component of torque adjustment mechanism 20 that moves when adjustment dial 24 rotates. In a specific embodiment, pin 50 actuates along longitudinal axis 18. In some embodiments, locking member 22 moves as adjustment dial 24 is rotated to remain near locking lever 66, e.g., an edge of window 46 on a moving cover 26 keeps locking member 22 close to locking lever 66. FIG. 8 also defines a first side 80 and second side 82 of torque adjustment mechanism 20.

Figure 9:
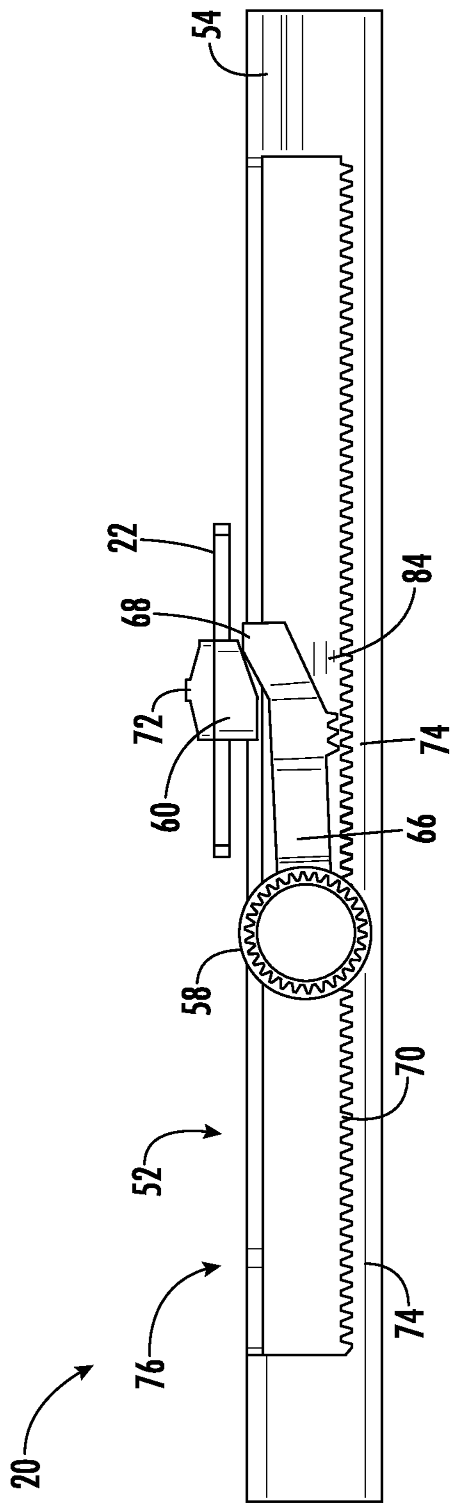
FIG. 9 is a cross-sectional view from a first side of the locking member and the torque adjustment mechanism in an unlocked position, according to an exemplary embodiment.

With reference to FIGS. 9-12, various configurations on either side (e.g., opposite sides) are shown of an unlocked position (FIGS. 9 and 11) and a locked position (FIGS. 10 and 12) of locking lever 66 within rack gear 70. FIG. 9 is a cross-sectional view of a first side 80 (FIG. 8) of locking member 22 and torque adjustment mechanism 20 in an unlocked position. Locking lever 66 of torque adjustment mechanism 20 includes a biasing element or compression spring 84 to bias the locking lever 66 away from engagement with rack gear 70. In the unlocked position, compression spring 84 is extended, and there is a clearance between teeth 74 on the bottom of locking lever 66 and teeth 74 on rack gear 70.

Figure 10:
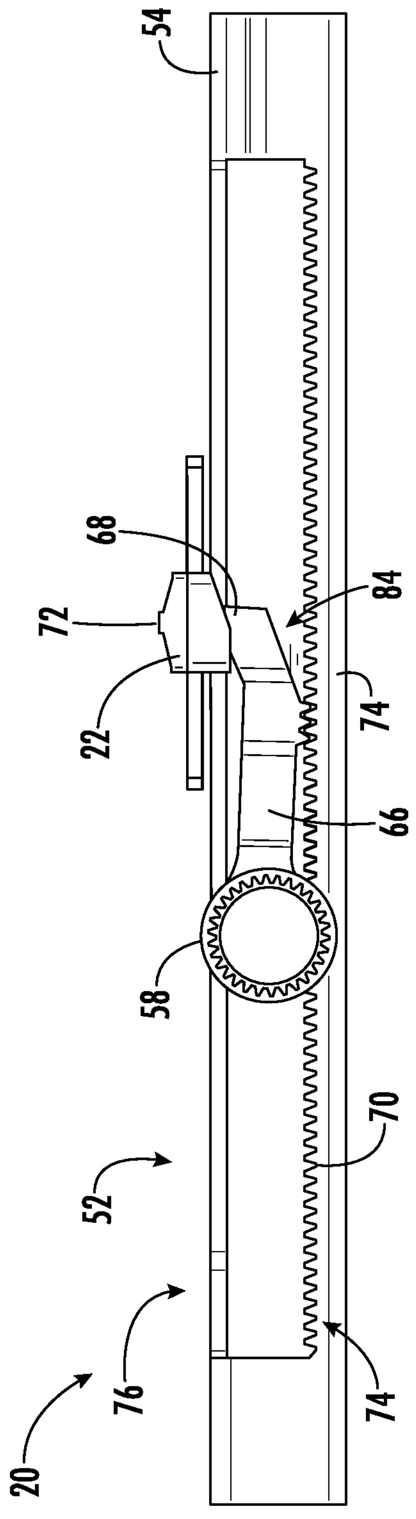
FIG. 10 is a cross-section view of FIG. 9 showing the locking member and the torque adjustment mechanism in a locked position, according to an exemplary embodiment.

FIG. 10 is the same cross-sectional view of first side 80, as shown in FIG. 9, but showing locking member 22 and torque adjustment mechanism 20 in a locked position. FIG. 10 shows teeth 74 of locking lever 66 engaged with teeth 74 on rack gear 70 on frame 54 to lock or secure torque adjustment mechanism 20 relative to frame 54 (e.g., head 12 and handle 14). Locking member 22 slides along rails 62 over a top of locking lever 66 to engage locking lever 66. Specifically, protrusions 60 of locking member 22 engage detents 68 on locking lever 66 to press against compression spring 84. When the biasing force of compression spring is over cover, protrusions 60 securely fit (e.g., couple) within detents 68 to lock the engagement of locking lever 66 with rack gear 70 on torque adjustment mechanism 20. In other words, FIGS. 9-10 show the selective engagement of locking lever 66 of torque adjustment mechanism 20 to rack gear 70 of frame 54, between an unlocked position (FIG. 9) and a locked position (FIG. 10). The downward force created by protrusions 60 on locking member 22 engage teeth 74 on locking lever 66 with teeth 74 in rack gear 70 to lock torque adjustment mechanism 20 at the applied torque indicated by pin 50 and limit the torque applied to a socket or fastener at head 12.

Figure 11:
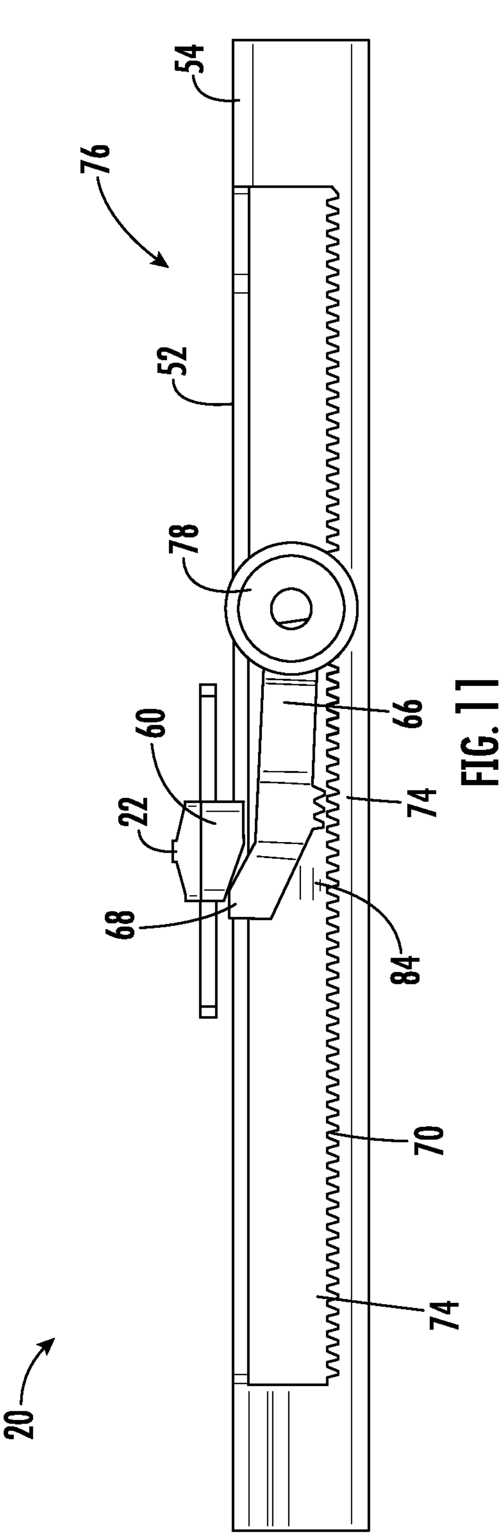
FIG. 11 is a cross-sectional view from a second side, e.g., opposite the first side of FIG. 9, of the locking member and the torque adjustment mechanism in an unlocked position, according to an exemplary embodiment.
Figure 12:
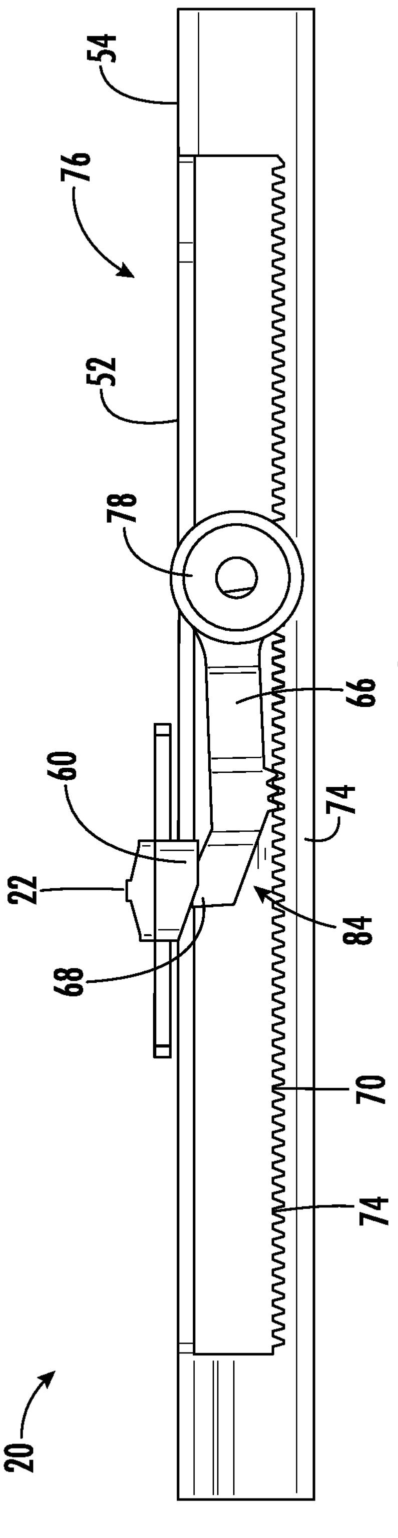
FIG. 12 is a cross-section view of FIG. 11 showing the locking member and the torque adjustment mechanism in a locked position, according to an exemplary embodiment.

FIG. 11 is a cross-sectional view of a second side 82 (FIG. 8), e.g., opposite first side 80 of FIGS. 9-10. FIG. 11 shows locking member 22 and torque adjustment mechanism 20 in an unlocked position. FIG. 12 is the same cross-sectional view as FIG. 11 and illustrates locking member 22 and torque adjustment mechanism 20 in a locked position.

It should be understood that the figures illustrate the exemplary embodiments in detail, and it should be understood that the present application is not limited to the details or methodology set forth in the description or illustrated in the figures. It should also be understood that the terminology is for the purpose of description only and should not be regarded as limiting.

Further modifications and alternative embodiments of various aspects of the invention will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes, and omissions may also be made in the design, operating conditions, and arrangement of the various exemplary embodiments without departing from the scope of the present invention.

For purposes of this disclosure, the term "coupled" means the joining of two components directly or indirectly to one another. Such joining may be stationary in nature or movable in nature. Such joining may be achieved with the two members and any additional intermediate members being integrally formed as a single unitary body with one another or with the two members or the two members and any additional member being attached to one another. Such joining may be permanent in nature or alternatively may be removable or releasable in nature.

While the current application recites particular combinations of features in the claims appended hereto, various embodiments of the invention relate to any combination of any of the features described herein whether or not such combination is currently claimed, and any such combination of features may be claimed in this or future applications. Any of the features, elements, or components of any of the exemplary embodiments discussed above may be used alone or in combination with any of the features, elements, or components of any of the other embodiments discussed above.

In various exemplary embodiments, the relative dimensions, including angles, length 28*s*, and radii, as shown in the Figures, are to scale. Actual measurements of the Figures will disclose relative dimensions, angles, and proportions of the various exemplary embodiments. Various exemplary embodiments extend to various ranges around the absolute and relative dimensions, angles, and proportions that may be determined from the Figures. Various exemplary embodiments include any combination of one or more relative dimensions or angles that may be determined from the Figures. Further, actual dimensions not expressly set out in this description can be determined by using the ratios of dimensions measured in the Figures in combination with the express dimensions set out in this description. In addition, in various embodiments, the present disclosure extends to a variety of ranges (e.g., plus or minus 30%, 20%, or 10%) around any of the absolute or relative dimensions disclosed herein or determinable from the Figures.

What is claimed is:

1. A torque wrench, comprising:
- a head configured to engage a fastener;
- a handle extending along a longitudinal axis and configured to be grasped by a user;
- a primary beam coupled at a first end to the head and at a second end to the handle;
- a secondary beam coupled to the head and selectively coupled to the primary beam; and
- a torque adjustment mechanism configured to adjust an applied torque setting, the torque adjustment mechanism comprising:
  - a rack gear;
  - a locking lever biased away from engagement with the rack gear; and
  - a locking member configured to engage the locking lever with the rack gear;
  - wherein the locking lever selectively engages the rack gear to lock the torque adjustment mechanism when the locking member is moved into engagement with the locking lever.

2. The torque wrench of claim 1, further comprising a housing that surrounds the primary beam and the secondary beam.

3. The torque wrench of claim 1,
wherein the locking member is coupled to the handle.

4. The torque wrench of claim 3, wherein a protrusion that extends from the locking member extends through a slot of the handle to engage the locking lever.

5. The torque wrench of claim 1, further comprising a cover slidably coupled to the handle such that the cover moves relative to a pin indicating the applied torque setting.

6. The torque wrench of claim 5, wherein the pin actuates along the longitudinal axis.

7. The torque wrench of claim 5, further comprising a frame including a display, the display includes units of torque.

8. The torque wrench of claim 7, further comprising a slot in the frame that extends along the longitudinal axis of the handle, wherein the slot is elongated, and the display surrounds the slot and includes indicia of the applied torque setting.

9. The torque wrench of claim 1, further comprising:
- a switch that releasably couples the primary beam and the secondary beam; and
- a biasing element that biases the switch against at least one of the primary beam and the secondary beam.

10. The torque wrench of claim 9, wherein the switch overcomes a biasing force of the biasing element to decouple the primary beam and the secondary beam as a result of an applied torque exceeding the applied torque setting.

11. A torque wrench, comprising:
- a head configured to engage a fastener;
- a handle extending along a longitudinal axis and comprising a window through the handle;
- a primary beam coupled at a first end to the head and at a second end to the handle;
- a secondary beam selectively coupled to the primary beam; and
- a torque adjustment mechanism configured to adjust an applied torque setting, the torque adjustment mechanism comprising:
  - a rack gear;
  - a locking lever within the handle, the locking lever being adjustable between an unlocked position and a locked position, wherein the locking lever engages the rack gear and locks the torque adjustment mechanism when the locking lever is in the locked position; and
  - a locking member coupled to the handle;
- wherein the locking lever adjusts between the unlocked position and the locked position when the locking member is moved relative to the handle along the longitudinal axis.

12. The torque wrench of claim 11, comprising a housing that surrounds the primary beam and the secondary beam.

13. The torque wrench of claim 11, further comprising:
- a switch that releasably couples the primary beam and the secondary beam; and
- a biasing element that biases the switch against at least one of the primary beam and the secondary beam.

14. The torque wrench of claim 11, wherein the locking member is at least partially external to the handle.

15. The torque wrench of claim 14, wherein a protrusion that extends from the locking member extends through a slot of the handle to engage the locking lever.

16. The torque wrench of claim 14, wherein the locking member is slidably coupled to the handle.

17. The torque wrench of claim 11, further comprising an adjustment dial engaged with the handle, the adjustment dial actuating along the longitudinal axis.

18. A torque wrench, comprising:
- a head configured to engage a fastener;
- a handle extending along a longitudinal axis, the handle comprising a window through the handle;

a primary beam coupled at a first end to the head and at a second end to the handle;

a secondary beam selectively coupled to the primary beam; and a torque adjustment mechanism configured to adjust an applied torque setting, the torque adjustment mechanism comprising:

a partially exposed frame within the handle, the frame comprising a surface facing the window and a slot positioned along the surface and at least partially visible through the window, the slot extending along the surface in a direction along the longitudinal axis of the handle;

a pin extending through the slot, the pin indicating the applied torque setting;

a rack gear;

a locking lever biased away from engagement with the rack gear; and a locking member configured to engage the locking lever with the rack gear;

wherein the locking lever selectively engages the rack gear to lock the torque adjustment mechanism when the locking member is moved into engagement with the locking lever.

19. The torque wrench of claim 18, further comprising an adjustment dial engaged with the frame, the adjustment dial actuating along the longitudinal axis.

20. The torque wrench of claim 18, wherein the pin is coupled to the primary beam, and the pin actuates along the longitudinal axis within the window.

* * * * *